(12) United States Patent
Werdecker et al.

(10) Patent No.: US 8,408,027 B2
(45) Date of Patent: Apr. 2, 2013

(54) METHOD FOR THE PRODUCTION OF A COMPOSITE BODY FROM A BASIC BODY OF OPAQUE QUARTZ GLASS AND A TIGHT SEALING LAYER

(75) Inventors: Waltraud Werdecker, Hanan (DE); Johann Leist, Altenstadt (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 405 days.

(21) Appl. No.: 12/452,413

(22) PCT Filed: Jun. 18, 2008

(86) PCT No.: PCT/EP2008/057654
§ 371 (c)(1),
(2), (4) Date: Jan. 12, 2010

(87) PCT Pub. No.: WO2009/003839
PCT Pub. Date: Jan. 8, 2009

(65) Prior Publication Data
US 2010/0115996 A1    May 13, 2010

(30) Foreign Application Priority Data

Jun. 30, 2007  (DE) .......................... 10 2007 030 698

(51) Int. Cl.
*C03C 17/02*    (2006.01)
(52) U.S. Cl. ....................................................... 65/33.4
(58) Field of Classification Search ..................... 65/33.4
See application file for complete search history.

(56) References Cited

U.S. PATENT DOCUMENTS

| 5,736,206 A | 4/1998 | Englisch et al. |
| 6,306,489 B1 * | 10/2001 | Hellmann et al. ......... 428/312.6 |

(Continued)

FOREIGN PATENT DOCUMENTS

| DE | 44 40 104 A1 | 5/1995 |
| DE | 44 40 104 C2 | 4/1996 |

(Continued)

OTHER PUBLICATIONS

Rahaman. Ceramic Processing and Sintering. New York: Marcel Dekker, 1995. pp. 264-272.*

(Continued)

*Primary Examiner* — Matthew Daniels
*Assistant Examiner* — Russell Kemmerle, III
(74) *Attorney, Agent, or Firm* — Tiajoloff and Kelly LLP

(57) ABSTRACT

To optimize a known method for producing a composite body from a basic body of opaque quartz glass and a dense sealing layer, in such a way that the basic body can be provided with the dense sealing layer without any significant changes and deformations in the opaque material being noticed, the invention suggests a method comprising the following steps: (a) producing the basic body by using a first slip which contains larger amorphous $SiO_2$ particles; (b) providing a second slip which contains smaller amorphous $SiO_2$ particles and the composition of which differs from that of the first slip at least in that it contains $SiO_2$ nanoparticles in the range between 0.2% by wt. to 15% by wt. and which is distinguished by a relatively low vitrification temperature; (d) producing a slip layer from the second slip on a surface of the basic body, drying the slip layer, and (e) subsequently vitrifying the slip layer with formation of the dense sealing layer.

26 Claims, 1 Drawing Sheet

U.S. PATENT DOCUMENTS

Figure 1:
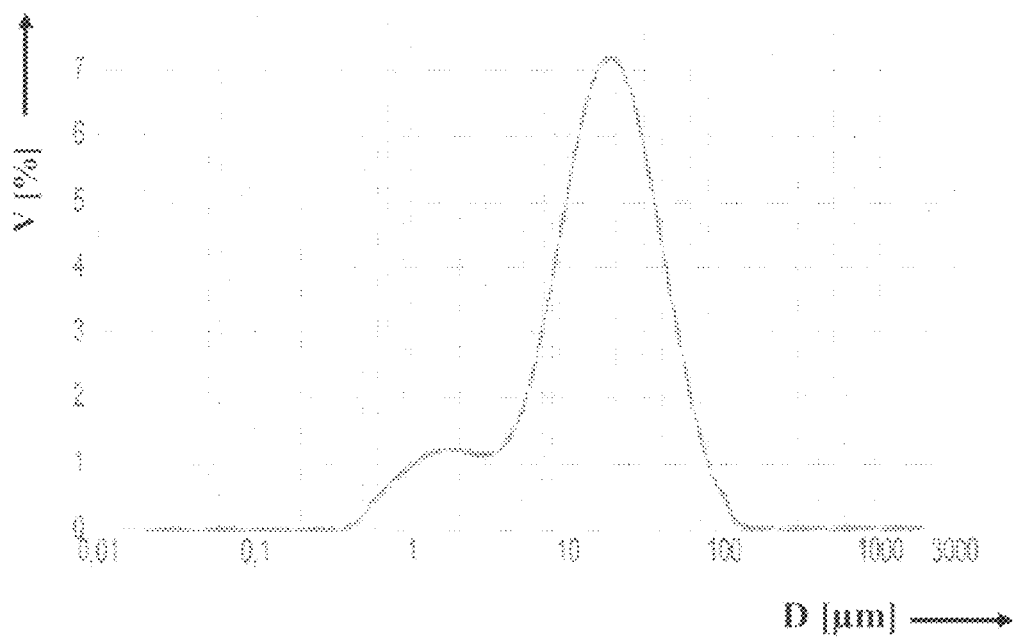

| | | | |
|---|---|---|---|
| 6,627,265 B2 * | 9/2003 | Kutilek | ............ 427/163.1 |
| 7,563,512 B2 | 7/2009 | Maul et al. | |
| 2006/0038470 A1 | 2/2006 | Maul et al. | |
| 2006/0046075 A1 | 3/2006 | Maul et al. | |
| 2008/0075949 A1 | 3/2008 | Kirst et al. | |
| 2009/0316268 A1 | 12/2009 | Werdecker et al. | |

FOREIGN PATENT DOCUMENTS

| | | |
|---|---|---|
| DE | 10 2004 052 312 A1 | 3/2006 |
| DE | 698 06 628 T3 | 9/2006 |
| DE | 10 2006 062 166 A1 | 6/2008 |
| WO | WO 99/20574 | 4/1999 |
| WO | WO 2008/077807 A1 | 7/2008 |

OTHER PUBLICATIONS espacenet English language abstract for DE 44 40 104 A1 published May 18, 1995.

espacenet English language abstract for DE 44 40 104 C2 published Apr. 25, 1996.

espacenet English language abstract for DE 698 06 628 T2 published Feb. 6, 2003.

espacenet English language abstract for WO 2008/077807 A1 published Jul. 3, 2008.

* cited by examiner

METHOD FOR THE PRODUCTION OF A COMPOSITE BODY FROM A BASIC BODY OF OPAQUE QUARTZ GLASS AND A TIGHT SEALING LAYER

The present invention relates to a method for producing a composite body from a basic body of opaque quartz glass and a dense sealing layer.

Quartz glass components are often exposed to high thermal loads and chemically aggressive environments. With such applications a good thermal insulation, a high temperature stability or thermal shock resistance as well as high chemical resistance and absence of any contamination play an important role. Increasingly greater demands are made on the service lives of such quartz glass' components and the absence of particles in such components.

As for the service life of a quartz glass component, the absence of bubbles in near-surface areas plays an important role. For instance, bubbles that are first closed and then opened during use on account of material removal are often the reason why impurities or particles exit, which terminates the life time of the component for particle-sensitive applications.

PRIOR ART

The use of quartz glass components consisting of synthetic quartz glass can particularly be recommended in semiconductor production for preventing contamination. A less expensive alternative in comparison therewith is described in DE 698 06 628 T2, which also discloses a quartz glass component for semiconductor manufacture and a method according to the above-mentioned type. This publication suggests the manufacture of a dense layer of synthetic quartz glass on a quartz glass component produced in advance in a separate method step from natural raw material. To this end $SiO_2$ particles are produced by flame hydrolysis of a silicon-containing start component in a deposition burner, and the particles are deposited on the surface of the component and are immediately vitrified at said place with formation of a transparent, bubble-free, dense and smooth sealing layer of synthetic quartz glass.

The sealing layer is formed by relative movement of the deposition burner and the component surface to be coated relative to one another, with the layer growth depending on the current deposition rate and the number of sub-layers.

The manufacture of sealing layers by such a deposition process, particularly the reproducible manufacture of uniform layer thicknesses, is tedious and requires great efforts in terms of apparatus and time.

A further method for producing a dense and transparent sealing layer on a porous green body produced by a slip casting method is described in DE 44 40 104 C2. In this method an aqueous suspension of $SiO_2$ particles of a chemical purity of 99.9% $SiO_2$ is produced and cast into a plaster mold, and the green body obtained in this way is heated in a furnace to a sintering temperature in the range of 1,350° C. to 1,450° C. and is sintered in this process into a basic body of opaque quartz glass. Subsequently, the surface of the basic body is locally heated by means of an oxyhydrogen flame to elevated temperatures in the range between 1,650° C. and 2,200° C., so that the opaque basic material is converted in a near-surface region of a thickness of about 0.5 mm into transparent quartz glass.

It has however been found that transparent layer thicknesses of more than 2 mm cannot be achieved with this method. The vitrified transparent sealing layer obviously makes it difficult to heat the underlying layers in an appropriate way. This problem cannot be solved by increased flame temperatures because these lead to a plastic deformation of the component and the evaporation of gaseous silicon monoxide (SiO). Furthermore, stresses that might lead to the deformation of the component are induced by vitrification at high temperatures.

A method of the above-mentioned type is known from DE 10 2004 052 312 A1. It is suggested that a basic body of opaque quartz glass should be provided with a surface layer in that an $SiO_2$ slip with the properties known from DE 44 40 104 C2 is applied as a slip layer and then dried and vitrified with formation of a transparent or opaque cover layer. The goal is a high etching resistance of the composite body.

However, it has been found that during vitrification of the slip layer the underlying opaque material of the basic body is also modified and that stresses and deformations may arise.

Since the slip casting process would per se permit an inexpensive manufacture of components, also of a complex geometry, it is desirable to minimize said drawbacks arising in the production of composite bodies from quartz glass with a dense sealing layer.

TECHNICAL OBJECT

It is therefore the object of the present invention to indicate a method by means of which a basic body of opaque quartz glass can be provided with a dense sealing layer without significant changes and deformations in the opaque material being noticed.

This object is achieved according to the invention by a method which comprises the following steps:

(a) producing the basic body by using a first slip which contains a first dispersion liquid and first amorphous $SiO_2$ particles having particle sizes of not more than 500 μm, particles with particle sizes in the range between 1 μm and 60 μm accounting for the largest solids volume fraction, which contains a first quantitative amount of $SiO_2$ nanoparticles with particle sizes of less than 100 nm, and which is distinguished by a first higher vitrification temperature;

(b) providing a second slip which contains a second dispersion liquid and second amorphous $SiO_2$ particles having particle sizes of not more than 100 μm, particles with particle sizes in the range between 1 μm and 40 μm accounting for the largest solids volume fraction, and the composition of which differs from that of the first slip at least in that it contains a second quantitative amount of $SiO_2$ nanoparticles which in the range between 0.2% by wt. to 15% by wt. is greater than the first quantitative amount (based each time on the total solids content), and which is distinguished by a second lower vitrification temperature;

(c) producing a slip layer from the second slip on a surface of the basic body, drying the slip layer, (d) and subsequently vitrifying the slip layer with formation of the dense sealing layer.

The basic body is a body of quartz glass that is produced from synthetically prepared raw materials or from naturally occurring raw materials. This quartz glass is opaque or translucent. The second slip is for instance applied by immersion, spraying, spreading by doctor blade or in a screen printing process. The consistency of the slip is adapted to the respective application method and ranges from free-flowing to paste-like.

In the method of the invention, the composite body is completely produced by way of the "slip route". In contrast to the known method, however, slip qualities that differ in their characteristics with respect to their specific vitrification temperatures are used for producing the basic body and the sealing layer, respectively. An essential aspect of the invention consists in providing measures that increase the difference of the specific vitrification temperatures of the slips.

A measure for different vitrification temperatures consists in that the second slip, which vitrifies at a lower temperature, additionally contains $SiO_2$ nanoparticles for forming the sealing layer, or that it contains more $SiO_2$ nanoparticles than the first slip for producing the basic body. More precisely, the quantitative portion of $SiO_2$ nanoparticles in the range between 0.2% by wt. to 15% by wt. in the second slip is higher than the corresponding quantitative portion in the first slip. The second slip contains a given amount of $SiO_2$ nanoparticles, whereas the quantitative amount of $SiO_2$ nanoparticles in the first slip can be small and approach zero.

$SiO_2$ nanoparticles are understood to be $SiO_2$ particles with particle sizes in the range of a few nanometers up to 100 nm. Such nanoparticles consist typically of a few thousand $SiO_2$ units and have a specific BET surface area of 40-800 $m^2/g$, preferably between 55-200 $m^2/g$.

A further measure for achieving different vitrification temperatures is that the second slip vitrifying at a lower temperature has a particle size distribution where relatively small particles—between 1 μm and 40 μm—account for the largest volume fraction.

Since the vitrification temperatures of basic body and slip layer are different, this permits a vitrification of the slip layer at a lower temperature on the one hand, so that less stresses are introduced into the basic body, whereby a deformation of the basic body is avoided. And on the other hand, the formation of a sealing layer is made possible, which layer is clearly distinct in its chemical, mechanical and particularly optical properties from those of the basic body. Although basic body and sealing layer are made of quartz glass, a defined boundary without any major transition area is formed between them; this enhances, for example, the efficiency of a diffuse reflection. Moreover, essential functions of the sealing layer must be seen in the fact that it seals open pores of the basic body to the outside, and that it protects the opaque quartz glass of the basic body during the intended use or during possible cleaning measures against corrosive attack.

The sealing layer within the meaning of the invention is distinguished by a closed porosity and a comparatively higher density and it is translucent or transparent. By contrast, the opaque or at least partly opaque quartz glass of the basic body serves as a heat barrier. Opaque quartz glass is normally white, reflects infrared radiation and therefore exhibits a good heat-insulating action.

The vitrification process of a dried slip layer is in general defined not only by the vitrification temperature, but also considerably by the vitrification duration. With a higher temperature vitrification is just accelerated. It is essential within the meaning of the invention that the slip layer for forming the sealing layer is denser and more transparent than the quartz glass of the basic body with the same vitrification period and the same vitrification temperature. The greater the density difference, the more efficient is the sealing layer. It is only for the purpose of a possible comparison that the slip-specific vitrification temperature within the meaning of the invention is defined as the temperature at which a slip layer which has a thickness of 1 mm and is air-dried in a furnace at 90° C. for a drying period of 2 hours becomes so transparent during the subsequent vitrification in air for a period of four hours that it exhibits a spectral transmission of at least 60% in the wavelength range between 600 nm to 2650 nm.

A vitrification of the dried slip layer by local heating, e.g. by means of a flame or a laser, is accompanied with a lower energy input and is particularly preferred whenever a deformation or another change in the basic body must be feared.

It has turned out to be advantageous when the second slip contains between 0.5% by wt. and 8% by wt., and particularly preferably between 1% by wt. and 4% by wt., of $SiO_2$ nanoparticles (based on the total solids content).

The $SiO_2$ nanoparticles effect a consolidation of the slip layer and a decrease in the vitrification temperature at the same time. Moreover, the $SiO_2$ nanoparticles help to increase the green strength of the dried slip, which facilitates handling and reduces the formation of cracks during drying and vitrification. This is particularly true for $SiO_2$ nanoparticles that have particle sizes of less than 100 nm, preferably less than 50 nm.

On average, the second slip contains much smaller $SiO_2$ particles than the first slip. It has turned out to be useful when in the second slip amorphous $SiO_2$ particles with particle sizes in the range between 1 μm and 30 μm account for the largest solids volume fraction.

Preferably, the second amorphous $SiO_2$ particles of the second slip have a particle size distribution which is distinguished by a $D_{50}$ value of less than 40 μm, preferably less than 30 μm, and particularly preferably less than 15 μm.

$SiO_2$ particles in this order enable the setting of a particularly high solids content of the second slip and exhibit advantageous vitrification characteristics, so that the corresponding slip layer can be vitrified at particularly low temperatures.

In comparison therewith, the amorphous $SiO_2$ particles of the first slip preferably have a particle size distribution which is distinguished by a $D_{50}$ value greater than the $D_{50}$ value of the particle size distribution in the second slip. This measure will also increase the difference in the vitrification temperatures between the first and the second slip.

The solids content of the second slip is preferably set to be as high as possible. With this in mind, the second amorphous $SiO_2$ particles have a multimodal particle size distribution, with a first maximum of the size distribution ($D_{50}$ value) in the range of 0.5 μm to 3 μm, preferably 1 μm to 3 μm, and with a second maximum in the range of 5 μm to 40 μm, preferably 5 μm to 15 μm.

Such a multimodal particle size distribution with at least two, preferably three or more distribution maxima, facilitates the setting of a high solids density of the second slip, whereby shrinkage during drying and sintering and thus the risk of the formation of cracks are reduced. For instance, particle distributions with $D_{50}$ values of 2, 5, 15, 20 and 40 μm are used alone or in combination.

It has turned out to be particularly advantageous when at least 90% by wt. of the second amorphous $SiO_2$ particles of the second slip are made spherical.

Spherical particles help to set a high solids density in the slip, so that stresses are reduced during drying and vitrification. Ideally, all of the $SiO_2$ particles of the second slip are made spherical.

By comparison, preferably at least 50% by wt. of the amorphous $SiO_2$ particles of the first slip are present in splintery form, the particles being produced by wet grinding of $SiO_2$ start granules.

The amorphous particles are here produced by wet grinding $SiO_2$ granules, and they show a particle size distribution within the above-mentioned range. Such amorphous $SiO_2$ particles show comparatively low shrinkage during drying. Therefore, the slip of the basic body can be dried and vitrified without crack formation, as is also otherwise known from the prior art. Moreover, due to the presence of splintery $SiO_2$ granules the mechanical strength of the green body is increased after drying, which is particularly noticed in a positive way in relatively thick basic bodies.

Due to the combined use of amorphous $SiO_2$ particles with a predominantly splintery morphology for the preparation of the basic body and of amorphous $SiO_2$ particles with a predominantly spherical morphology for making the sealing layer, there are also differences in the sintering behavior and thus at the same time in the resulting optical properties of the neighboring quartz glass qualities, which facilitates the formation of a defined boundary without any large transition area around the contact surface.

It has turned out to be advantageous when during production of the slip layer the solids content of the second slip (weight proportion of the $SiO_2$ particles and the $SiO_2$ nanoparticles together) is in the range between 80% and 90%, and preferably at least 83% by wt.

A high solids content contributes to uniform and low shrinkage so that drying and sintering cracks are avoided. Therefore, relatively large thicknesses of the slip layer can be generated with slips having high solids contents. On the other hand, the applicability of the second slip is decreasing at very high solids contents of more than 90%.

Advantageously, the second amorphous $SiO_2$ particles and the $SiO_2$ nanoparticles are made of synthetic $SiO_2$.

Synthetic $SiO_2$ is characterized by high purity. The quartz glass of the sealing layer produced in this way therefore shows an impurity content of less than 1 wt. ppm (apart from possible dopants), so that it shows little absorption in the UV range up to about a wavelength of about 180 nm, and thus hardly impairs the reflector properties of the basic body. This is particularly true for the UV wavelength range. Moreover, a sealing layer of high purity prevents impurities from exiting from the basic body and thereby also permits the use of a more inexpensive basic body of a relatively low purity also for impurity-sensitive applications, e.g. in semiconductor production.

The dispersion liquid may consist of an aqueous base. This is particularly advantageous for the production of the first slip for forming the basic body. The polar nature of the aqueous phase of such a slip can have an advantageous effect on the interaction of the $SiO_2$ particles.

For the second slip according to the invention the second dispersion liquid, however, is preferably made up of an organic solvent, preferably, based on alcohol.

Drying is thereby carried out much faster than in the case of an aqueous slip phase. This saves time and fixes the slip layer onto the basic body at a faster pace, so that off-flowing of the slip layer is prevented. The processing period can be adapted to the respective requirements by adding a small amount of water (less than 30% by vol.) to the dispersion liquid.

Preferably, the $SiO_2$ content of the first and the second amorphous $SiO_2$ particles is at least 99.9% by wt.

The solids content of the slip produced by using such particles consists of at least 99.9% by wt. of $SiO_2$ (apart from the addition of dopants). Binders and other additives are in general not needed and, ideally, they are also not contained. The content of metal oxide impurities is preferably less than 1 wt. ppm. The degree of purity of the quartz glass for the sealing layer is normally higher than that of the quartz glass of the basic body. In this body the $SiO_2$ particles are normally made up of purified, naturally occurring raw material, as is described in the above-mentioned DE 44 40 104 C12.

It has turned out to be useful when the difference between first and second vitrification temperature is at least 40° C., preferably at least 60° C.

The greater the difference between the two vitrification temperatures, the easier is the formation of a dense and transparent sealing layer on a porous basic body without any distortion or significant resintering. On the other hand, great differences in the vitrification temperature are normally accompanied by differences in the coefficients of thermal expansion of the different glasses, which in turn would have a disadvantageous effect on the adhesion of the dense sealing layers. The difference in the vitrification temperature is thus preferably not higher than 150° C.

In this connection it has turned out to be advantageous when the dried slip layer is vitrified by heating to a temperature ranging between 1000° C. and 1460° C., preferably between 1200° C. and 1440° C.

It is essential that the quartz glass of the basic body is opaque and thus remains diffusely reflective, whereas the sealing layer is sintered to be dense and without any open porosity. The complete transparence of the sealing layer is the preferred embodiment if emphasis is laid on high density, absence of pores and high resistance to etching of the composite body to be produced.

It has turned out to be advantageous when the basic body is present as a porous green body during formation of the slip layer.

A slip layer made from the second slip is applied to the non-vitrified green body produced via the slip route, as has been described above. The composite structure of green body and slip layer is then vitrified. This method variant has the advantage that at a given vitrification temperature, e.g. 1430° C., the slip layer is already vitrified into a transparent sealing layer while the green body still remains opaque. Hence, only a single vitrification process is needed for making a composite body consisting of basic body and sealing layer.

In an alternative and equally preferred variant of the method, a basic body of opaque quartz glass is present in the formation of the slip layer.

The layer made of the second slip is here applied to an already pre-vitrified basic body. This variant of the method permits a preceding and precise treatment of the basic body that in the case of a porous green body would not be possible without difficulty because of the mechanical low stability thereof. To be more specific, the basic body is configured as a thin-walled, opaque, mechanically cut or ground plate.

A method variant is preferred in which the transparent sealing layer is formed in successive order by repeating the above-mentioned method steps (b) and (c), the particle size distribution of the respectively used second slip being more and more shifted towards a finer granulation.

The sealing layer is here produced in successive order, with a second slip being first used that contains relatively coarse particles, whereby open pores existing in the basic body are closed. Thereupon, further slip layers are applied once or repeatedly, the slip being distinguished by a finer particle size distribution. This makes it possible to produce smooth surfaces. This procedure is suited to build up sealing layers that are as thick as possible, or a sealing layer that comprises an intermediate layer with special properties.

After every application of the slip layer, said layer is dried. However, it has turned out to be also useful when the slip layer is thermally consolidated at least to a slight extent—though consolidation need here not be carried out to such an extent that there will be transparence.

Particularly with respect to high reflection in the UV wavelength range a method variant has turned out to be useful in which an opaque intermediate layer of synthetic quartz glass with high reflection in the UV wavelength range is formed between the basic body and the sealing layer.

A high reflection in the UV wavelength range (e.g. of more than 90%) presupposes opacity and an extremely high degree of purity of the quartz glass. The last-mentioned prerequisite is normally not satisfied in the case of the quartz glass of the basic body, so that the basic body is then non-reflecting in the UV wavelength range. In the method variant an intermediate layer is produced on the basic body, said intermediate layer satisfying both of the above-mentioned preconditions. Purity is ensured by the use of synthetically produced $SiO_2$; a minor contamination with lithium oxide should here particularly be mentioned. The content of lithium is below 100 wt. ppb, preferably less than 20 wt. ppb. The opacity of the intermediate layer is e.g. accomplished in that the amorphous $SiO_2$ granulation is chosen to be relatively coarse-grained and/or in that no or only a small number of $SiO_2$ nanoparticles are added to the slip in question.

Especially for use of the composite body in semiconductor manufacture with applications under reactive etching process media, it has turned out to be advantageous when a dopant that enhances the etch resistance of quartz glass is added to the second slip.

Suitable dopants are aluminum, nitrogen and rare-earth metals, said metals being normally present as oxides or nitrides in the quartz glass.

It has turned out to be useful when a plate-shaped basic body is used and provided with the sealing layer.

The basic body is here present as a plate of any desired geometry (ring, rectangle, circle, or the like) with planar surfaces, and it is obtained through the slip casing method. The plate form is directly predetermined by the slip casting process, or it is subsequently produced by mechanically treating the shaped body obtained by slip casting.

The surface of the basic body is provided fully or in part with a sealing layer; preferably at least one or two of the plane surfaces are here sealed; a sealing of the front faces is here also possible for special applications.

The composite body obtained according to the method is preferably used as a reflector. So far plate-shaped reflectors have also been produced for use in semiconductor manufacture in that an opaque quartz glass plate is fused at both sides with transparent plates of quartz glass and the composite structure is subsequently elongated. This procedure, however, is very complicated, resulting in slightly corrugated surfaces. The opaque quartz glass plate obtained according to the method of the invention is suited for replacing opaque quartz glass plates of a sandwich structure.

In this context it has turned out to be particularly advantageous when the composite body which is provided with the sealing layer comprises a plane surface and is elongated in a direction in parallel with the plane surface.

The composite body having a plane surface serves here as a preform from which a composite plate of predetermined final dimensions can be drawn by elongation, the plate being particularly distinguished by a dense and smooth surface.

EMBODIMENT

The invention shall now be explained in more detail with reference to embodiments and a drawing, in which there is shown in detail in FIG. 1 a diagram of the $SiO_2$ particle size distribution of a raw material component to be used for making a slip for producing a sealing layer (before the addition of $SiO_2$ nanoparticles); and FIG. 2 a quartz glass plate for use as a thermal radiation reflector in semiconductor manufacture, in a schematic illustration.

FORMATION OF A PLATE-SHAPED BASIC BODY

Example 1

A slip is made from water and $SiO_2$ particles and homogenized by wet grinding, as described in DE 44 40 104 A1. Following the standard mold casting, drying and sintering at 1440° C. a plate-shaped sintered body of opaque quartz glass is formed from this slip with dimensions of 400×400 mm and a thickness of 2 mm. The spectral transmission of the opaque quartz glass in the wavelength range between 200 nm and 2650 nm is less than 4%.

Manufacture of the Slip for a Sealing Layer

A further slip is made that serves to produce the sealing layer. FIG. 1 shows a particle size distribution of an essential raw material component of this slip. The volume fraction V is plotted (in %) on the y-axis, and the particle diameter D (in µm) on the x-axis.

This raw material component consists of spherical, synthetically produced $SiO_2$ particles that are distinguished by a multimodal particle size distribution with a relatively narrow maximum of the size distribution at about 15 µm ($D_{50}$ value). A secondary maximum is in the range of around 2 µm. This raw material component with a $D_{50}$ value at 15 µm is designated hereinafter as $R_{15}$.

Further raw material components that show $D_{50}$ value at 5 µm, 30 µm and 40 µm, and the particle size distributions of which are otherwise similar to those shown in FIG. 1, which means in particular that said raw material components have each a particle size distribution with a secondary maximum around 2 µm, are used for making the slip. Said raw material components are designated with $R_5$, $R_{30}$ and $R_{40}$, respectively, depending on their $D_{50}$ value of the main maximum. Said raw material components are previously cleaned in a hot chlorination method. The content of contamination of the purified raw material components is low and is on the whole less than 1 wt. ppm. Especially the content of $Li_2O$ is less than 10 wt. ppb.

Moreover, $SiO_2$ nanoparticles that have diameters around 40 nm and are designated as "pyrogenic silica" are added to the raw material components.

The following recipes have turned out to be useful:

Recipe 1

| | |
|---|---|
| $R^{30}$ | 250 g |
| $R_{15}$ | 500 g |
| $R_5$ | 200 g |

Pyrogenic silica: 50 g with a BET surface area of 60 m²/g

The said components are dispersed in pure ethanol, resulting in a solids content of 86% by wt.

Recipe 2

| | |
|---|---|
| $R_{15}$ | 400 g |
| $R_5$ | 90 g |

Pyrogenic silica: 10 g with a BET surface area of 200 m²/g
The said components are dispersed in pure ethanol, resulting in a solids content of 84% by wt.
Recipe 3

$R_{15}$  270 g
$R_5$  35 g

Pyrogenic silica: 4 g with a BET surface area of 50 m²/g
The said components are dispersed in methanol with 70 g polysilazane. The solids content is 83% by wt.

The highly filled slips prepared in this way show a thixotropic behavior. The slips are adapted to be cast and spread, and that is why they are particularly well suited for processing techniques such as immersion and spreading by doctor blade (dispersion coating, stripping, scraping, filling, dressing, troweling, or the like). In each recipe the grain sizes below 30 μm account for the largest volume fraction of the granules.

Manufacture of a Composite Body Consisting of Sintered Body and Sealing Layer

Example 1

The above-described plate-shaped opaque sintered body (basic body) is immersed for a few seconds into the slip according to recipe 1. This leads to the formation of a uniform closed slip layer having a thickness of about 1 mm. This slip layer based on ethanol is first dried at room temperature for about 5 hours, with evaporation of the ethanol. The dried slip layer is without cracks, and it has a mean thickness of slightly less than 0.9 mm.

The dried slip layer is then vitrified together with the sintered body (=composite body) in a vitrification furnace. The heating profile comprises a slow heating up to 400° C. and a holding time of 2 h for removing hydrocarbon residues. Subsequently, the composite body is heated within one hour to a lower heating temperature of 1000° C. and held at said temperature for 2 hours, and it is subsequently heated for four hours via a second flat heating ramp to an upper heating temperature of 1440° C. The holding time in the upper heating temperature is two hours in the embodiment. The slip layer is then fully vitrified to obtain a sealing layer. It is transparent and free of bubbles and its density is about the density of quartz glass. Its direct spectral transmission in the wavelength range between 200 nm and 2650 nm is above 60%. Opacity and spectral transmission of the sintered body are unchanged.

Figure 2:
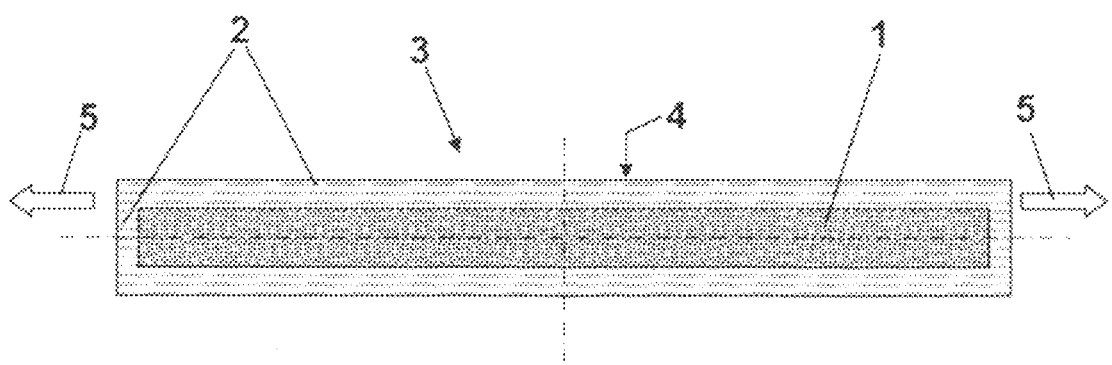

FIG. 2 shows the composite body obtained in this way in the form of a coated quartz glass plate 3 schematically with reference to a sectional illustration. The plate 3 consists of a rectangular basic body 1 of opaque quartz glass, which is surrounded on all sides by a crack-free and transparent SiO₂ sealing layer 2, which is drawn in an exaggerated thickness in the figure for reasons of illustration. The overall thickness of the quartz glass plate 3 is here slightly less than 4 mm.

The mean layer thickness of the sealing layer 2 is 0.8 mm. It is distinguished by the absence of cracks and by chemical and mechanical properties that correspond to those of quartz glass. It shows a high resistance to dry etching as compared with the standard fluorine-containing process gases of the semiconductor manufacture.

Elongation of the Composite Body

The composite body 3 can be used in the above-described form directly as a thermal radiation reflector. It may however also serve as a preform for making a comparatively large quartz glass plate in that it is elongated in a direction parallel to the plate surface 4 in a hot chlorination process, as illustrated by directional arrows 5. Advantageous elongation ratios for the quartz glass plate 3 are between 2 or 5.

Manufacture of a Plate-Shaped Basic Body Example 2

A slip is made from water and SiO₂ particles and homogenized by wet grinding, as is described in DE 44 40 104 A1. A ring-shaped green body of porous SiO₂ with an outer diameter of 300 mm and a thickness of 20 mm is made from said slip after the standard mold casting and drying.

Manufacture of a Composite Body

Example 2

A slip according to recipe 3 is applied to the surface of the annular green body. Said slip shows a relatively low viscosity and can be easily applied by spreading. This forms a uniform closed slip layer having a thickness of about 2 mm. The slip layer solidifies very rapidly because the porous green body absorbs part of the liquid. Following the complete drying the slip layer is without cracks, and it has a mean thickness of approximately less than 1.8 mm.

The dried slip layer is then vitrified together with the green body in a vitrification furnace. The heating profile corresponds to that as has been described above with reference to Example 1, with the exception that the holding time is three hours at the upper heating temperature of 1440° C. Slip layer and green body are then vitrified completely. The green body is now present as an opaque quartz glass, the spectral transmission of which is less than 4% in the above-mentioned wavelength range. By comparison the slip layer is present as a transparent and bubble-free sealing layer with a thickness of about 1.5 mm. Its density is approximately identical with that of quartz glass and it has a direct spectral transmission in the wavelength range between 200 nm and 2650 nm above 60% (based on a thickness of 1 mm).

It is distinguished by the absence of cracks and a high resistance to dry etching with respect to the standard fluorine-containing process gases in semiconductor manufacture. The resulting composite body can be used as a flange for chemical reactors or as a single-wafer holder.

The invention claimed is:

1. A method for producing a composite body having a basic body of opaque quartz glass and a dense sealing layer, the method comprising:
   (a) producing the basic body from a first slip, said first slip containing a first dispersion liquid and first amorphous SiO₂ particles having particle sizes of not more than 500 μm, wherein the first amorphous SiO₂ particles that have particle sizes in a range between 1 μm and 60 μm constitute a largest fraction of a total volume of solids in the first slip, wherein the first slip contains a first concentration of SiO₂ nanoparticles with particle sizes of less than 100 nm by weight based on a total solids content of the first slip, and wherein the first slip has a first vitrification temperature;
   (b) providing a second slip that contains a second dispersion liquid and second amorphous SiO₂ particles having particle sizes of not more than 100 μm, wherein the second amorphous SiO₂ particles that have particle sizes in a range between 1 μm and 40 μm constitute a largest fraction of a total volume of solids in the second slip, the second slip having a composition that differs from a composition of the first slip at least in that the second slip contains a second concentration of $SiO_2$ nanoparticles with particle sizes of less than 100 nm in a range between 0.2% by wt. to 15% by wt. of a total solids content of the second slip, the second concentration being greater than the first concentration, and wherein the second slip has a second vitrification temperature lower than the first vitrification temperature;

(c) producing a slip layer from the second slip on a surface of the basic body, and drying the slip layer; and (d) vitrifying the slip layer so as to form the dense sealing layer.

2. The method according to claim 1, wherein the $SiO_2$ nanoparticles in the second slip constitute between 0.5% by wt. and 8% by wt. of a total solids content of the second slip.

3. The method according to claim 1, wherein the second amorphous $SiO_2$ particles of the second slip have particle sizes in a range between 1 μm and 30 μm in an amount such that said particles account for a greater volume of solids in the second slip than $SiO_2$ particles having sizes outside said range.

4. The method according to claim 1, wherein the second amorphous $SiO_2$ particles of the second slip have a particle size distribution that has a $D_{50}$ value of less than 15 μm.

5. The method according to claim 4, wherein the first slip amorphous $SiO_2$ particles have a particle size distribution that has a $D_{50}$ value greater than the $D_{50}$ value of the particle size distribution of the second slip.

6. The method according to claim 1, wherein the second amorphous $SiO_2$ particles have a multimodal particle size distribution, with a first maximum of the size distribution being a $D_{50}$ value in a range of 0.5 μm to 3 μm and with a second maximum being a $D_{50}$ value in a range of 5 μm to 40 μm.

7. The method according to claim 1, wherein at least 90% by wt. of the second amorphous $SiO_2$ particles of the second slip are spherical.

8. The method according to claim 1, wherein at least 50% by wt. of the first amorphous $SiO_2$ particles of the first slip are produced by wet grinding $SiO_2$ start granules and are present in splintery form.

9. The method according to claim 1, wherein during production of the slip layer the solids content of the second slip determined as a weight amount of the $SiO_2$ particles and the $SiO_2$ nanoparticles together is between 80% and 90% by wt.

10. The method according to claim 1, wherein the second amorphous $SiO_2$ particles and the $SiO_2$ nanoparticles consist of synthetic $SiO_2$.

11. The method according to claim 1, wherein the second dispersion liquid is based on an organic solvent.

12. The method according to claim 1, wherein the first and the second amorphous $SiO_2$ particles each have a $SiO_2$ content that is at least 99.9% by wt.

13. The method according to claim 1, wherein the difference between the first and second vitrification temperatures is at least 40° C.

14. The method according to claim 1, wherein the dried slip layer is vitrified according to method step (d) by heating to a temperature between 1000° C. and 1460° C.

15. The method according to claim 1, wherein the basic body is present as a porous green body during the formation of the slip layer.

16. The method according to claim 1, wherein the basic body is present as opaque quartz glass during the formation of the slip layer.

17. The method according to claim 1, wherein the sealing layer is transparent and is formed by successive iterations of steps (b) and (c), wherein each iteration uses a respective additional second slip with a respective particle size distribution of $SiO_2$ particles thereof, the particle size distribution of the respectively used second slip of each iteration being progressively changed towards a lower $D_{50}$ value than the particle size distribution of the additional second slip of the previous iteration of steps (b) and (c).

18. The method according to claim 17, wherein method step (c) is followed by vitrification according to method step (d).

19. The method according to claim 1, wherein an opaque intermediate layer of synthetic quartz glass with a high reflection in the UV wavelength range is produced between the basic body and the sealing layer.

20. The method according to claim 1, wherein a dopant that increases the etch resistance of quartz glass is added to the second slip.

21. The method according to claim 1, wherein the composite body is a diffusely reflecting reflector.

22. The method according to claim 1, wherein the first slip has added thereto a dopant counteracting vitrification into transparent quartz glass.

23. The method according to claim 22, wherein the dopant is present in a nanoscale form and is selected from the group consisting of $Si_3N_4$, SiC and AlN.

24. The method according to claim 1, wherein the basic body is plate shaped.

25. The method according to claim 24, wherein the composite body with the sealing layer has a planar surface and is elongated in a direction parallel with the planar surface.

26. The method according to claim 1, wherein the $SiO_2$ nanoparticles in the second slip constitute between 1% by wt. and 4% by wt. of a total solids content of the second slip.

* * * * *